United States Patent [19]

Hall

[11] 3,834,650

[45] Sept. 10, 1974

[54] TAPE CARTRIDGE

[75] Inventor: Peter Joseph Hall, Willowdale, Ontario, Canada

[73] Assignee: Microfilm Recording Company Limited, Weston, Ontario, Canada

[22] Filed: Mar. 30, 1973

[21] Appl. No.: 346,654

[52] U.S. Cl. .................................. 242/192, 242/197

[51] Int. Cl.... G03b 1/04, G11b 15/32, G11b 23/04

[58] Field of Search .................... 242/192, 195–197, 242/200, 71.1; 352/72–78; 274/4 B, 11 B; 206/52, 59

[56] References Cited

UNITED STATES PATENTS

| | | | |
|---|---|---|---|
| 1,996,782 | 4/1935 | Wood | 242/71.1 |
| 3,150,840 | 9/1964 | Briskin et al. | 242/195 |
| 3,620,480 | 11/1971 | Knox | 242/199 |
| 3,744,736 | 7/1973 | Krühn | 242/195 |

*Primary Examiner*—Leonard D. Christian
*Attorney, Agent, or Firm*—Fetherstonhaugh & Co.

[57] ABSTRACT

A tape cartridge for fully winding a tape and a leader of greater width than the tape within the storage chamber formed within the housing. A pair of oppositely disposed winding shoulders are formed one on each end wall of the housing and extend substantially circumferentially thereof to receive the marginal edges of the leader while permitting the narrower tape to pass therebetween to be wound onto a spool which is rotatable within the housing. A passage opens outwardly from the chamber from within the housing to provide access to a leader mounted on the shoulder to permit the leader to be driven out of the chamber by being engaged by a roller or the like.

5 Claims, 3 Drawing Figures

TAPE CARTRIDGE

FIELD OF INVENTION

This invention relates to tape cartridges. In particular this invention relates to a tape cartridge which is suitable for use in association with a tape or film having a leader which is totally withdrawn within the cartridge and a recording or reproducing apparatus with an automatic tape threading capability.

In order to utilize the threading capability of known tape recording and reproducing apparatus, it is important to provide a tape cartridge which, while locating the tape in a totally enclosed position, will ensure a positive engagement with the leader to effect removal of the leader from the cartridge in use.

SUMMARY OF INVENTION

The present invention provides a simple and inexpensive tape cartridge construction which permits easy removal of the tape leader so that it may be fed into a recording or transcribing apparatus.

According to an embodiment of the present invention, a tape cartridge comprises a housing having a storage chamber formed therein adapted to rotatably receive a spool bearing a tape or film and a leader, the leader being wider than the tape and having marginal edges projecting outwardly beyond the tape. The chamber has a pair of oppositely disposed end walls and a pair of oppositely disposed winding shoulders are formed one on each end wall. The oppositely disposed winding shoulders extend substantially circumferentially of the chamber and are aligned to receive the marginal edge portions of the leader and spaced to permit a tape to pass therebetween. A passage is also provided in the housing opening into the chamber to provide access to a leader supported on the shoulders in use.

PREFERRED EMBODIMENT

Figure 1:
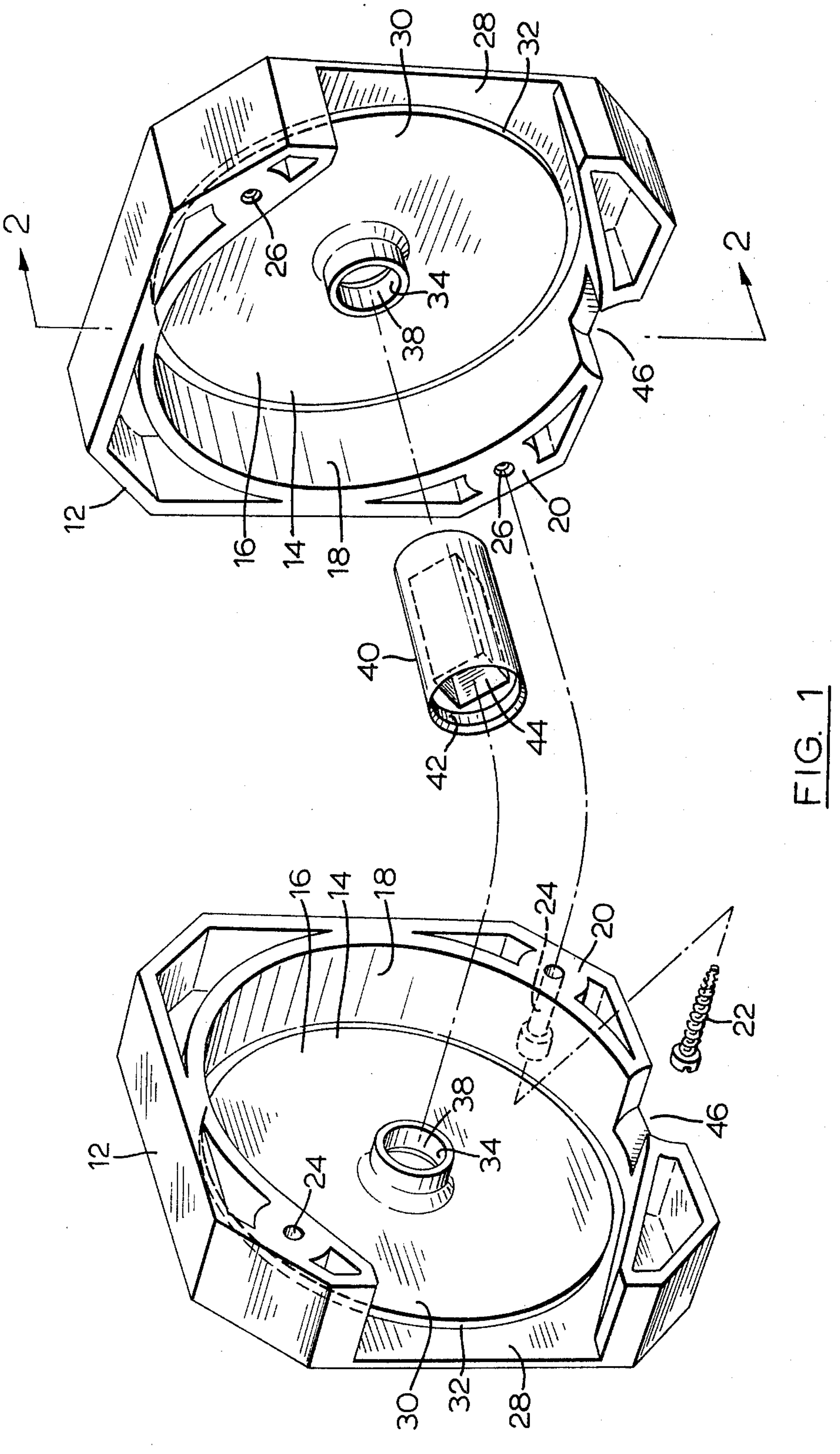
Figure 3:
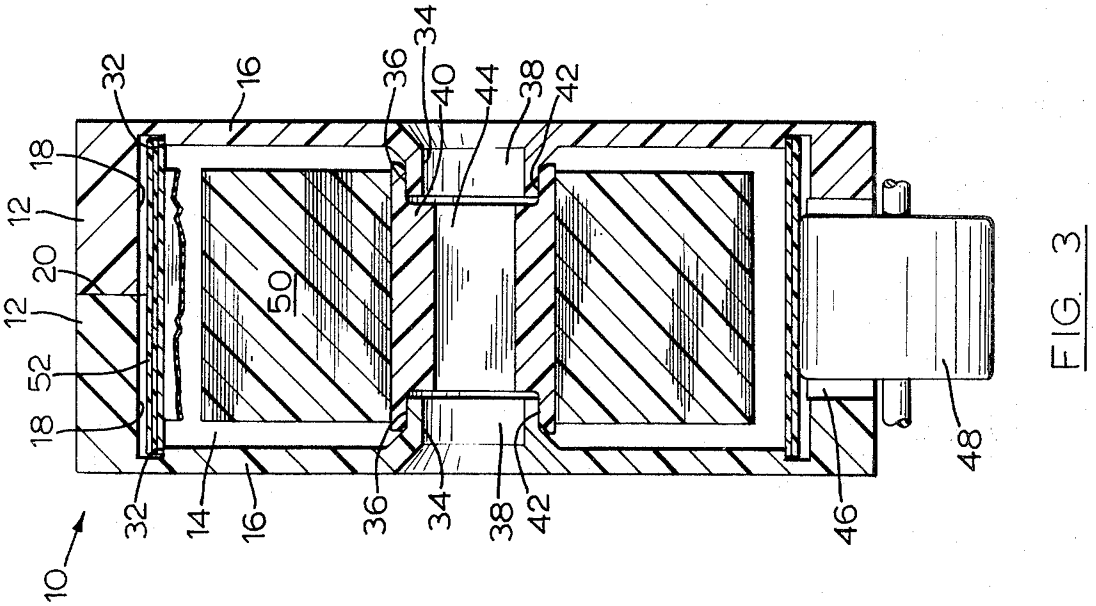
Figure 2:
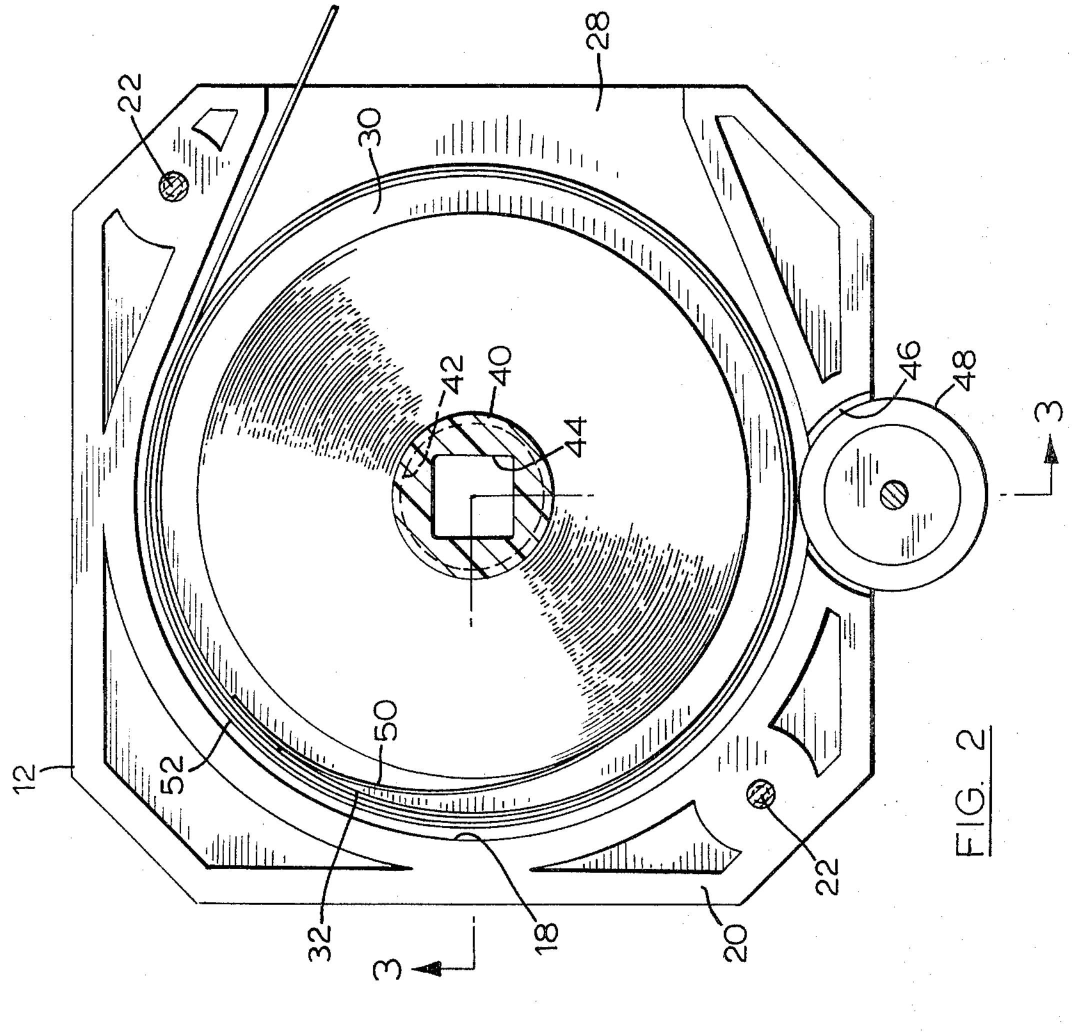

The invention will be more clearly understood after reference to the following detailed specification read in conjunction with the drawings wherein FIG. 1 is an exploded view of a tape cartridge according to an embodiment of the present invention;

FIG. 2 is a side view of a loaded cartridge taken in the direction of the arrows 2—2 of FIG. 1; and FIG. 3 is a sectional end view taken in the direction of the arrows 3—of FIG. 2.

With reference to the drawings, it will be seen that the tape cartridge comprises a housing which is generally identified by the reference numeral 10 and which consists of two sections 12 which co-operate with one another to form a tape storage chamber 14. Each of the sections 12 has an end wall 16 and a side wall 18. The side walls 18 have inner faces 20 which abut one another when the cartridge is assembled as shown in FIG. 3 of the drawings. The two halves of the cartridge are held together by means of locking screws 22 which pass through passages 24 in one section 12 and are threadably received in passages 26 in the other section 12. A first passage 28 opens through the side walls 18 to provide access to the chamber 14.

A circular boss 30 is formed on each end wall 16. Each boss 30 provides a winding shoulder 32 which extends substantially circumferentially of the chamber 14. The shoulder 32 on one end wall 16 is aligned with the shoulder 32 on the other end wall. Spigots 34 project outwardly from each end wall 26 and each spigot 34 has a bearing surface 36 formed thereon and a through passage 38 extending therethrough.

A cylindrical shaped spool 40 is formed with a pair of oppositely disposed circular recesses 42 adapted to receive the bearing surfaces 36 in a close fitting sliding relationship. The spool 40 also has a square passage 44 extending longitudinally therethrough.

A second passage 46 opens through the side walls 12 and provides access for a drive wheel 48 to permit the drive wheel 48 to project into the path of the leader within the chamber 14.

The cartridge of the present invention is used in association with a film or a tape 50 which has a leader 52 connected at one end thereof. The leader 52 has a greater width than the tape 50. The tape 50 is wound onto the spool 40 and is sufficiently narrow to pass between the shoulders 32. The leader 52 is drawn into the housing by reason of its connection to the tape 50, and it is prevented from winding directly around the spool 40 by means of the shoulders 32. The shoulders 32 engage the marginal edge portions of the leader 52 and retain the leader radially outwardly from the spool 40.

In use, the tape 50 is wound onto the spool 40 and the spool 40 is located within housing 14 in a position wherein the leader 52 extends around the shoulders 32. Preferably the leader 52 has a total length equal to about 1½ times the circumferential length of the shoulders 20. This ensures that the tape does not bind upon itself when driven out of the cartridge in use. It has been found that there is a tendency for the leader to bind upon itself when the drive wheel engages a double thickness of leader and consequently the length of the leader is preferably less than twice the circumfereital length of the shoulders 32. In use, the cartridge is located within a recording or transcribing apparatus so that the drive wheel 48 of the apparatus is positioned as shown in FIGS. 2 and 3 of the drawings in engagement with the leader 52. Rotation of the drive wheel 48 causes the leader 52 to slide along the shoulders 32 and to discharge through the opening 28 in the housing. The opening 28 in the housing is contoured to ensure that the leader 52 may discharge from the housing tangentially with respect to the shoulder 32 so that it may be easily discharged from the housing. The winding of the spool is effected by mounting the spool with the passage 44 thereof in driving engagement with the drive shaft of the apparatus in which the spool is to be used.

The housing and spool may be made from any suitable plastic material.

Various modifications of the present invention will be apparent to those skilled in the art without departing from the scope of the invention. For example, access to the leader for the purpose of unwinding the leader may be achieved through the passage 28, thereby eliminating the need for a second passage 46.

In addition it will be apparent that the plain spool described above may be replaced by a reel having side walls. This modification may be achieved by forming the shoulder 32 on annular rings disposed radially outwardly from the outer edges of the side walls.

What is claimed is:

1. A tape cartridge comprising:

a. a housing having a storage chamber formed therein adapted to rotatably receive a cylindrical spool bearing a tape and a leader, the leader being wider than the tape and having marginal edge portions projecting outwardly beyond the film;

b. said chamber having a pair of oppositely disposed end walls;

c. a pair of oppositely disposed annular winding shoulders integrally formed one on each end wall concentric with the spool and extending substantially circumferentially thereabout at a radius greater than the radius of the tape when wound on the spool, said shoulders being aligned to receive and support the marginal edges of said leader and spaced to permit the tape to pass therebetween and d. passage means opening into said chamber affording access to a leader supported on said shoulders in use.

2. A tape cartridge as claimed in Claim 1 including conical bearing means formed on said oppositely disposed side walls, and cooperative conical bearing surfaces on the spool and supporting the spool on said bearing means

3. A tape cartridge comprising:

a. a housing having a storage chamber formed therein having a pair of oppositely disposed end walls and side wall means extending therebetween;

b. a cylindrical spool for winding a tape thereon of the type having a leader which is wider than the tape and has marginal edges projecting outwardly beyond the tape;

c. bearing means formed on said end walls for mounting said spool for rotation in said chamber;

d. a pair of oppositely disposed annular winding shoulders integrally formed one on each end wall concentric with the spool and extending substantially circumferentially thereabout at a radius greater than the radius of the tape when wound on the spool, said shoulders being aligned to receive and support the marginal edges of said leader and spaced to permit the tape to pass therebetween, and e. passage means opening into said chamber affording access to a leader supported on said shoulders in use.

4. A tape cartridge as claimed in claim 3 wherein at least one of said end walls is formed with a drive shaft clearance passage axially aligned with said spool, said spool having passage means formed axially therein adapted to receive a drive shaft to rotate said spool in use.

5. A tape cartridge as claimed in claim 1 including a tape wound on said spool, said tape having a leader which has a length which is less than twice the circumferential length of said shoulders.

* * * * *